US011005265B1

(12) United States Patent
Benavides et al.

(10) Patent No.: US 11,005,265 B1
(45) Date of Patent: May 11, 2021

(54) SYSTEM AND METHOD FOR IMPLEMENTING A ZERO-SEQUENCE CURRENT FILTER FOR A THREE-PHASE POWER SYSTEM

(71) Applicant: Switched Source LLC, Vestal, NY (US)

(72) Inventors: Nicholas Benavides, Indianapolis, IN (US); Brett Robbins, Indianapolis, IN (US); Thomas Craddock, Indianapolis, IN (US)

(73) Assignee: SWITCHED SOURCE LLC, Vestal, NY (US)

( * ) Notice: Subject to any disclaimer, the term of this patent is extended or adjusted under 35 U.S.C. 154(b) by 0 days.

(21) Appl. No.: 16/864,094

(22) Filed: Apr. 30, 2020

Related U.S. Application Data

(60) Provisional application No. 62/949,826, filed on Dec. 18, 2019.

(51) Int. Cl.
*H02J 3/18* (2006.01)
*H01F 30/12* (2006.01)

(52) U.S. Cl.
CPC ............ *H02J 3/1857* (2013.01); *H01F 30/12* (2013.01)

(58) Field of Classification Search
CPC ........ H02J 3/1857; H01F 30/12; H02M 7/483
See application file for complete search history.

(56) References Cited

U.S. PATENT DOCUMENTS

| 4,555,659 | A | * | 11/1985 | Gyugyi | ................. | H02J 3/1864 |
| | | | | | | 323/210 |
| 5,568,371 | A | | 10/1996 | Pitel et al. | | |
| 5,831,842 | A | | 11/1998 | Ogasawara et al. | | |
| 5,984,173 | A | | 11/1999 | Edwards | | |
| 9,285,817 | B2 | | 3/2016 | Wong | | |
| 9,294,003 | B2 | | 3/2016 | Peng | | |
| 2005/0253564 | A1 | | 11/2005 | Choi | | |

(Continued)

OTHER PUBLICATIONS

Jou et al. "Analysis of Zig-Zag Transformer Applying in the Three-Phase Four-Wire Distribution Power System" IEEE Transactions on Power Delivery, vol. 20, No. 2, Apr. 2005.

(Continued)

*Primary Examiner* — Kyle J Moody
(74) *Attorney, Agent, or Firm* — Philip E. Levy; Eckert Seamans Cherin & Mellott, LLC

(57) ABSTRACT

In a three-phase, four-wire electrical distribution system, a zig-zag transformer and at least one Cascade Multilevel Modular Inverter (CMMI) is coupled between the distribution system and the neutral. A controller modulates the states of the H-bridges in the CMMI to build an AC waveform. The voltage is chosen by the controller in order to control an equivalent impedance that draws an appropriate neutral current through the transformer. This neutral current is generally chosen to cancel the neutral current sensed in the line. The chosen neutral current may be based on a remotely sensed imbalance, rather than on a local value, determined by the power utility as a critical load point in the system. The desired injection current is then translated by the controller into a desired zero-sequence reactive impedance, based on measurement of the local terminal voltage, allowing the controller to regulate the current without generating or consuming real power.

7 Claims, 6 Drawing Sheets

(56) References Cited

U.S. PATENT DOCUMENTS

2014/0362618 A1* 12/2014 Hassan .................. H02M 1/12
363/35
2016/0365727 A1 12/2016 Kam et al.

OTHER PUBLICATIONS

Jou et. al."A Three-Phase Four-Wire Power Filter Comprising a Three-Phase Three-Wire Active Power Filter and a Zig-Zag Transformer" IEEE Transactions on Power Electronics, vol. 23, No. 1, Jan. 2008.

Singh, et. al. "Reduced Rating VSC With a Zig-Zag Transformer for Current Compensation in a Three-Phase Four Wire Distribution System" IEEE Transactions on Power Delivery vol. 24, No. 1, Jan. 2009.

Choi, S. and Jang, M. "Analysis and Control of a Single-Phase-Inverter—Zigzag-Transformer Hybrid Neutral-Current Suppressor in Three-Phase Four-Wire Systems" IEEE Transactions on Industrial Electronics, vol. 54, No. 4, Aug. 2007.

Nagarjuna, et al. "Reduced Rating VSC with a Zig-Zag Transformer for Current Compensation in a Three-Phase Four-Wire Distribution System" International Journal of Modern Engineering Research, vol. 2, Issue.4, Jul.-Aug. 2012 pp. 2957-2963.

\* cited by examiner ional Application Ser. No. 62/949,826, entitled "ZERO-SEQUENCE CURRENT FILTER FOR A THREE-PHASE POWER SYSTEM," filed Dec. 18, 2019, the contents of which are hereby incorporated by reference in its entirety.

GOVERNMENT LICENSE RIGHTS

This invention was made with the support of the New York State Energy Research and Development Authority (NYSERDA) under Agreement Number 133528 and NYSERDA may have rights in this invention.

TECHNICAL FIELD OF THE DISCLOSED EMBODIMENTS

The embodiments disclosed herein generally relate to three-phase power systems and, more specifically to a system and method for implementing a zero-sequence current filter for a three-phase power system.

BACKGROUND OF THE DISCLOSED EMBODIMENTS

An electrical power system normally operates in a balanced three-phase sinusoidal steady-state mode. However, there are certain situations that can cause unbalanced operations. The most severe of these would be a fault or short circuit. Examples may include a tree in contact with a conductor, a lightning strike, or downed power line. The basic theory of symmetrical components is that phase currents and voltages in a three-phase power system can be represented by three single-phase components. These are positive-, negative- and zero-sequence components. The positive sequence component of current or voltage has the same rotation as the power system. This component represents a balanced load.

If the generator phase currents are equal and displaced by exactly 120°, only positive-sequence current will exist. A current or voltage unbalance between phases in magnitude or phase angle gives rise to negative- and zero-sequence components. The negative sequence component has a rotation opposite that of the power system. The zero-sequence component represents an unbalance that causes current flow in the neutral.

High levels of positive-, negative- and zero-sequence harmonic currents are generated by the single-phase, non-linear loads that are connected between phase and neutral in a three-phase, four-wire distribution system. Although each single-phase, non-linear load is normally small, they often represent 95% to 100% of all loads connected to a low voltage distribution system in an office, data center or audio-video facility, for example. Perhaps more important, a driver of these imbalances is increased penetration of single-phase (e.g., residential) renewable power generation installations, which are "large" and somewhat unpredictable from a long-term planning standpoint.

Unlike the positive- and negative-sequence phase currents, which are each displaced by 120° in a three-phase system, zero-sequence currents are each displaced by 0° and are therefore "in-phase". As a result, zero-sequence currents combine arithmetically at the source transformer's neutral terminal and return to the nonlinear loads via the system's neutral conductor. In a worst case scenario, the resulting zero-sequence neutral currents may be greater than 1.5 times the phase currents.

Zero-sequence currents, acting in an Ohm's Law relationship with the system's zero-sequence impedances, produce zero-sequence voltages. These zero-sequence voltages distort the fundamental voltage waveforms. Systems and methods for alleviating fundamental frequency line load imbalance in the distribution system will thus reduce line loss and increase power system capacity without installing new lines.

Systems and methods for reducing zero-sequence current in a three-phase power system are therefore desirable. The presently disclosed embodiments are directed toward meeting this need.

SUMMARY OF THE DISCLOSED EMBODIMENTS

In one embodiment, a method for actively controlling zero-sequence current in a three-phase power distribution network having a phase A, a phase B, a phase C, and a neutral is disclosed, the method comprising the steps of: a) operatively coupling a first Cascade Multilevel Modular Inverter (CMMI) first terminal to phase A, and operatively coupling a first CMMI second terminal to a first primary winding dot terminal of a transformer; b) operatively coupling a second CMMI first terminal to phase B, and operatively coupling a second CMMI second terminal to a second primary winding dot terminal of the transformer; c) operatively coupling a third CMMI first terminal to phase C, and operatively coupling a third CMMI second terminal to a third primary winding dot terminal of the transformer; d) operatively coupling a third primary winding non-dot terminal of the transformer to a first secondary winding non-dot terminal of the transformer, wherein the first primary winding and the first secondary winding share a first common magnetic flux path; e) operatively coupling a first primary winding non-dot terminal of the transformer to a second secondary winding non-dot terminal of the transformer, wherein the second primary winding and the second secondary winding share a second common magnetic flux path; f) operatively coupling a second primary winding non-dot terminal of the transformer to a third secondary winding non-dot terminal of the transformer, wherein the third primary winding and the third secondary winding share a third common magnetic flux path; g) operatively coupling a first secondary winding dot terminal of the transformer, a second secondary winding dot terminal of the transformer, and a third secondary winding dot terminal of the transformer to the neutral; h) modulating a first voltage produced by the first CMMI to control a first equivalent impedance between phase A and the neutral; i) modulating a second voltage produced by the second CMMI to control a second equivalent impedance between phase B and the neutral; and j) modulating a third voltage produced by the third CMMI to control a third equivalent impedance between phase C and the neutral.

In another embodiment, a method for actively controlling zero-sequence current in a three-phase power distribution network having a phase A, a phase B, a phase C, and a neutral is disclosed, the method comprising the steps of: a) operatively coupling phase A to a first primary winding dot terminal of a transformer; b) operatively coupling phase B to a second primary winding dot terminal of the transformer; c) operatively coupling phase C to a third primary winding dot terminal of the transformer; d) operatively coupling a third primary winding non-dot terminal of the transformer to a first secondary winding non-dot terminal of the transformer, wherein the first primary winding and the first secondary winding share a first common magnetic flux path; e) operatively coupling a first primary winding non-dot terminal of the transformer to a second secondary winding non-dot terminal of the transformer, wherein the second primary winding and the second secondary winding share a second common magnetic flux path; f) operatively coupling a second primary winding non-dot terminal of the transformer to a third secondary winding non-dot terminal of the transformer, wherein the third primary winding and the third secondary winding share a third common magnetic flux path; g) operatively coupling a first secondary winding dot terminal of the transformer, a second secondary winding dot terminal of the transformer, and a third secondary winding dot terminal of the transformer to a transformer wye-point; h) operatively coupling a first Cascade Multilevel Modular Inverter (CMMI) first terminal to the transformer wye-point; i) operatively coupling a first CMMI second terminal to the neutral; and j) modulating a first voltage produced by the first CMMI to control an equivalent impedance between the transformer wye-point and the neutral.

In another embodiment, the above embodiment further comprises the steps of: j) operatively coupling a second CMMI first terminal to phase A and operatively coupling a second CMMI second terminal to phase B; k) operatively coupling a third CMMI first terminal to phase B and operatively coupling a third CMMI second terminal to phase C; l) operatively coupling a fourth CMMI first terminal to phase A and operatively coupling a fourth CMMI second terminal to phase C; m) modulating a second voltage produced by the second CMMI to control a second equivalent impedance between phase A and phase B; n) modulating a third voltage produced by the third CMMI to control a third equivalent impedance between phase B and phase C; and o) modulating a fourth voltage produced by the fourth CMMI to control a fourth equivalent impedance between phase A and phase C.

In another embodiment, a method for actively controlling zero-sequence current in a three-phase power distribution network having a phase A, a phase B, a phase C, and a neutral is disclosed, the method comprising the steps of: a) operatively coupling a first Cascade Multilevel Modular Inverter (CMMI) first terminal to phase A, and operatively coupling a first CMMI second terminal to a first primary winding dot terminal of a transformer; b) operatively coupling a second CMMI first terminal to phase B, and operatively coupling a second CMMI second terminal to a second primary winding dot terminal of the transformer; c) operatively coupling a third CMMI first terminal to phase C, and operatively coupling a third CMMI second terminal to a third primary winding dot terminal of the transformer; d) operatively coupling a third primary winding non-dot terminal of the transformer to a first secondary winding non-dot terminal of the transformer, wherein the first primary winding and the first secondary winding share a first common magnetic flux path; e) operatively coupling a first primary winding non-dot terminal of the transformer to a second secondary winding non-dot terminal of the transformer, wherein the second primary winding and the second secondary winding share a second common magnetic flux path; f) operatively coupling a second primary winding non-dot terminal of the transformer to a third secondary winding non-dot terminal of the transformer, wherein the third primary winding and the third secondary winding share a third common magnetic flux path; g) operatively coupling a first secondary winding dot terminal of the transformer, a second secondary winding dot terminal of the transformer, and a third secondary winding dot terminal of the transformer to a transformer wye-point; h) operatively coupling a fourth CMMI first terminal to the transformer wye-point; i) operatively coupling a fourth CMMI second terminal to the neutral; j) modulating a first voltage produced by the first CMMI to control a first equivalent impedance between phase A and the neutral; k) modulating a second voltage produced by the second CMMI to control a second equivalent impedance between phase B and the neutral; l) modulating a third voltage produced by the third CMMI to control a third equivalent impedance between phase C and the neutral; and m) modulating a fourth voltage produced by the fourth CMMI to control a fourth equivalent impedance between the transformer wye-point and the neutral.

In another embodiment, a method for actively controlling zero-sequence current in a three-phase power distribution network having a phase A, a phase B, a phase C, and a neutral is disclosed, the method comprising the steps of: a) operatively coupling a first Cascade Multilevel Modular Inverter (CMMI) first terminal to phase A, and operatively coupling a first CMMI second terminal to the neutral; b) operatively coupling a second CMMI first terminal to phase B, and operatively coupling a second CMMI second terminal to the neutral; c) operatively coupling a third CMMI first terminal to phase C, and operatively coupling a third CMMI second terminal to the neutral; d) modulating a first voltage produced by the first CMMI to control a first equivalent impedance between phase A and the neutral; e) modulating a second voltage produced by the second CMMI to control a second equivalent impedance between phase B and the neutral; and f) modulating a third voltage produced by the third CMMI to control a third equivalent impedance between phase C and the neutral.

The method of any of the above embodiments wherein the first common magnetic flux path comprises a first leg of an E-shaped transformer core, the second common magnetic flux path comprises a second leg of the E-shaped transformer core, and the third common magnetic flux path comprises a third leg of the E-shaped transformer core.

In another embodiment, a system for actively controlling zero-sequence current in a three-phase power distribution network having a phase A, a phase B, a phase C, and a neutral is disclosed, the system comprising: a transformer comprising: a first primary winding comprising a first primary winding dot terminal and a first primary winding non-dot terminal; a first secondary winding comprising a first secondary winding dot terminal and a first secondary winding non-dot terminal, wherein the first primary winding and the first secondary winding share a first common magnetic flux path; a second primary winding comprising a second primary winding dot terminal and a second primary winding non-dot terminal; a second secondary winding comprising a second secondary winding dot terminal and a second secondary winding non-dot terminal, wherein the second primary winding and the second secondary winding share a first common magnetic flux path; a third primary winding comprising a third primary winding dot terminal and a third primary winding non-dot terminal; and a third secondary winding comprising a third secondary winding dot terminal and a third secondary winding non-dot terminal, wherein the third primary winding and the third secondary winding share a first common magnetic flux path;

wherein the third primary winding non-dot terminal is operatively coupled to the first secondary winding non-dot terminal; wherein the first primary winding non-dot terminal is operatively coupled to the second secondary winding non-dot terminal; wherein the second primary winding non-dot terminal is operatively coupled to the third secondary winding non-dot terminal; wherein the first secondary winding dot terminal, the second secondary winding dot terminal, and the third secondary winding dot terminal are operatively coupled to the neutral; a first Cascade Multilevel Modular Inverter (CMMI) comprising a first CMMI first terminal and a first CMMI second terminal, wherein the first CMMI first terminal is operatively coupled to phase A, and the first CMMI second terminal is operatively coupled to the first primary winding dot terminal; a second CMMI comprising a second CMMI first terminal and a second CMMI second terminal, wherein the second CMMI first terminal is operatively coupled to phase B, and the second CMMI second terminal is operatively coupled to the second primary winding dot terminal; a third CMMI comprising a third CMMI first terminal and a third CMMI second terminal, wherein the third CMMI first terminal is operatively coupled to phase C, and the third CMMI second terminal is operatively coupled to the third primary winding dot terminal; and a controller operatively coupled to the first CMMI, the second CMMI, and the third CMMI, the controller operable to: a) modulate a first voltage produced by the first CMMI to control a first equivalent impedance between phase A and the neutral; b) modulate a second voltage produced by the second CMMI to control a second equivalent impedance between phase B and the neutral; and c) modulate a third voltage produced by the third CMMI to control a third equivalent impedance between phase C and the neutral.

In another embodiment, asystem for actively controlling zero-sequence current in a three-phase power distribution network having a phase A, a phase B, a phase C, and a neutral is disclosed, the system comprising: a transformer comprising: a first primary winding comprising a first primary winding dot terminal and a first primary winding non-dot terminal, wherein the first primary winding dot terminal is operatively coupled to phase A; a first secondary winding comprising a first secondary winding dot terminal and a first secondary winding non-dot terminal, wherein the first primary winding and the first secondary winding share a first common magnetic flux path; a second primary winding comprising a second primary winding dot terminal and a second primary winding non-dot terminal, wherein the second primary winding dot terminal is operatively coupled to phase B; a second secondary winding comprising a second secondary winding dot terminal and a second secondary winding non-dot terminal, wherein the second primary winding and the second secondary winding share a first common magnetic flux path; a third primary winding comprising a third primary winding dot terminal and a third primary winding non-dot terminal, wherein the third primary winding dot terminal is operatively coupled to phase C; and a third secondary winding comprising a third secondary winding dot terminal and a third secondary winding non-dot terminal, wherein the third primary winding and the third secondary winding share a first common magnetic flux path; wherein the third primary winding non-dot terminal is operatively coupled to the first secondary winding non-dot terminal; wherein the first primary winding non-dot terminal is operatively coupled to the second secondary winding non-dot terminal; wherein the second primary winding non-dot terminal is operatively coupled to the third secondary winding non-dot terminal; wherein the first secondary winding dot terminal, the second secondary winding dot terminal, and the third secondary winding dot terminal are operatively coupled to a transformer wye-point; a first Cascade Multilevel Modular Inverter (CMMI) comprising a first CMMI first terminal and a first CMMI second terminal, wherein the first CMMI first terminal is operatively coupled to the transformer wye-point, and the first CMMI second terminal is operatively coupled to the neutral; and a controller operatively coupled to the first CMMI, the controller operable to modulate a first voltage produced by the first CMMI to control an equivalent impedance between the transformer wye-point and the neutral.

In another embodiment, the prior embodiment further comprises: a second CMMI comprising a second CMMI first terminal and a second CMMI second terminal, wherein the second CMMI first terminal is operatively coupled to phase A, and the second CMMI second terminal is operatively coupled to phase B; a third CMMI comprising a third CMMI first terminal and a third CMMI second terminal, wherein the third CMMI first terminal is operatively coupled to phase B, and the third CMMI second terminal is operatively coupled to phase C; and a fourth CMMI comprising a fourth CMMI first terminal and a fourth CMMI second terminal, wherein the fourth CMMI first terminal is operatively coupled to phase A, and the fourth CMMI second terminal is operatively coupled to phase C; wherein the controller is operatively coupled to the second CMMI, the third CMMI, and the fourth CMMI, the further controller operable to: b) modulate a second voltage produced by the second CMMI to control a second equivalent impedance between phase A and phase B; c) modulate a third voltage produced by the third CMMI to control a third equivalent impedance between phase B and phase C; and d) modulate a fourth voltage produced by the fourth CMMI to control a fourth equivalent impedance between phase A and phase C.

In another embodiment, a system for actively controlling zero-sequence current in a three-phase power distribution network having a phase A, a phase B, a phase C, and a neutral is disclosed, the system comprising: a transformer comprising: a first primary winding comprising a first primary winding dot terminal and a first primary winding non-dot terminal; a first secondary winding comprising a first secondary winding dot terminal and a first secondary winding non-dot terminal, wherein the first primary winding and the first secondary winding share a first common magnetic flux path; a second primary winding comprising a second primary winding dot terminal and a second primary winding non-dot terminal; a second secondary winding comprising a second secondary winding dot terminal and a second secondary winding non-dot terminal, wherein the second primary winding and the second secondary winding share a first common magnetic flux path; a third primary winding comprising a third primary winding dot terminal and a third primary winding non-dot terminal; and a third secondary winding comprising a third secondary winding dot terminal and a third secondary winding non-dot terminal, wherein the third primary winding and the third secondary winding share a first common magnetic flux path; wherein the third primary winding non-dot terminal is operatively coupled to the first secondary winding non-dot terminal; wherein the first primary winding non-dot terminal is operatively coupled to the second secondary winding non-dot terminal; wherein the second primary winding non-dot terminal is operatively coupled to the third secondary winding non-dot terminal; wherein the first secondary winding dot terminal, the second secondary winding dot terminal, and the third secondary winding dot terminal are operatively coupled to a transformer wye-point; a first Cascade Multilevel Modular Inverter (CMMI) comprising a first CMMI first terminal and a first CMMI second terminal, wherein the first CMMI first terminal is operatively coupled to phase A, and the first CMMI second terminal is operatively coupled to the first primary winding dot terminal; a second CMMI comprising a second CMMI first terminal and a second CMMI second terminal, wherein the second CMMI first terminal is operatively coupled to phase B, and the second CMMI second terminal is operatively coupled to the second primary winding dot terminal; a third CMMI comprising a third CMMI first terminal and a third CMMI second terminal, wherein the third CMMI first terminal is operatively coupled to phase C, and the third CMMI second terminal is operatively coupled to the third primary winding dot terminal; a fourth CMMI comprising a fourth CMMI first terminal and a fourth CMMI second terminal, wherein the third fourth CMMI first terminal is operatively coupled to the transformer wye-point, and the fourth CMMI second terminal is operatively coupled to the neutral; and a controller operatively coupled to the first CMMI, the second CMMI, the third CMMI, and the fourth CMMI, the controller operable to: a) modulate a first voltage produced by the first CMMI to control a first equivalent impedance between phase A and the neutral; b) modulate a second voltage produced by the second CMMI to control a second equivalent impedance between phase B and the neutral; c) modulate a third voltage produced by the third CMMI to control a third equivalent impedance between phase C and the neutral; and d) modulate a fourth voltage produced by the fourth CMMI to control a fourth equivalent impedance between the transformer wye-point and the neutral.

In any of the above embodiments, wherein the first common magnetic flux path comprises a first leg of an E-shaped transformer core, the second common magnetic flux path comprises a second leg of the E-shaped transformer core, and the third common magnetic flux path comprises a third leg of the E-shaped transformer core.

In another embodiment, a system for actively controlling zero-sequence current in a three-phase power distribution network having a phase A, a phase B, a phase C, and a neutral is disclosed, the system comprising: a first Cascade Multilevel Modular Inverter (CMMI) comprising a first CMMI first terminal and a first CMMI second terminal, wherein the first CMMI first terminal is operatively coupled to phase A, and the first CMMI second terminal is operatively coupled to the neutral; a second CMMI comprising a second CMMI first terminal and a second CMMI second terminal, wherein the second CMMI first terminal is operatively coupled to phase B, and the second CMMI second terminal is operatively coupled to the neutral; a third CMMI comprising a third CMMI first terminal and a third CMMI second terminal, wherein the third CMMI first terminal is operatively coupled to phase C, and the third CMMI second terminal is operatively coupled to the neutral; and a controller operatively coupled to the first CMMI, the second CMMI, and the third CMMI, the controller operable to: a) modulate a first voltage produced by the first CMMI to control a first equivalent impedance between phase A and the neutral; b) modulate a second voltage produced by the second CMMI to control a second equivalent impedance between phase B and the neutral; and c) modulate a third voltage produced by the third CMMI to control a third equivalent impedance between phase C and the neutral.

In any of the above embodiments, wherein the controller comprises a proportional-integral controller.

BRIEF DESCRIPTION OF DRAWINGS

The present invention will become more fully understood from the detailed description and the accompanying drawings, wherein.

DETAILED DESCRIPTION OF THE DISCLOSED EMBODIMENTS

Figure 1:
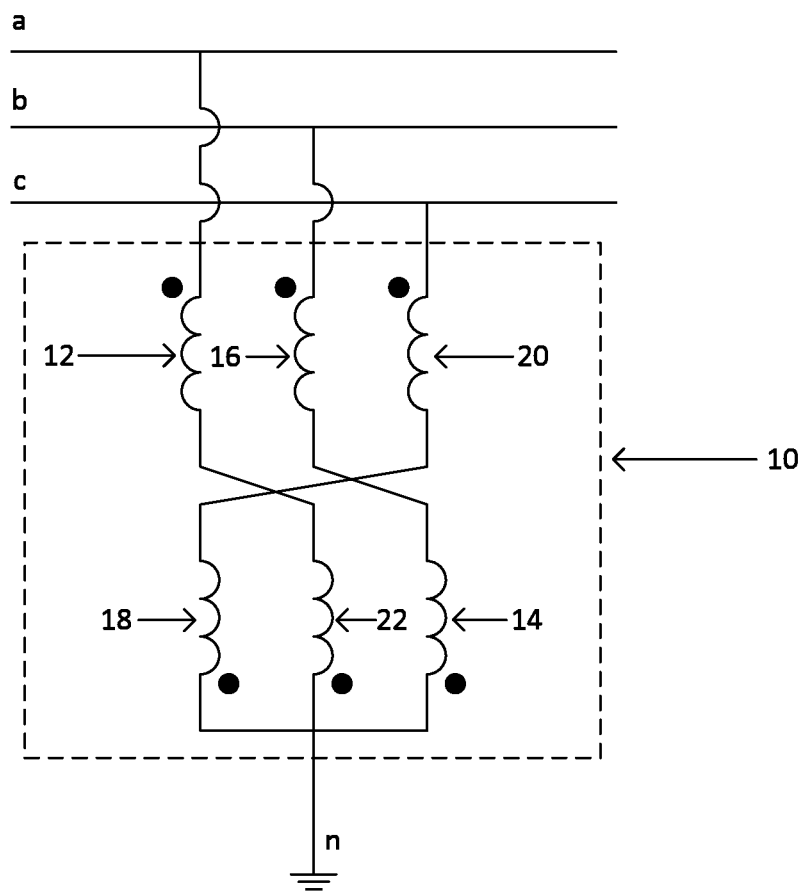
FIG. 1 is a schematic diagram illustrating a conventional four-terminal zig-zag transformer which is applied to a three-phase, four-wire electrical distribution system in accordance with an embodiment.

For the purposes of promoting an understanding of the principles of the invention, reference will now be made to the embodiments illustrated in the drawings, and specific language will be used to describe those embodiments. It will nevertheless be understood that no limitation of the scope of the invention is intended. Alterations and modifications in the illustrated device, and further applications of the principles of the invention as illustrated therein, as would normally occur to one skilled in the art to which the invention relates are contemplated and desired to be protected. Such alternative embodiments require certain adaptations to the embodiments discussed herein that would be obvious to those skilled in the art.

FIG. 1 is a schematic diagram illustrating a conventional four-terminal zig-zag transformer, indicated generally at 10, which is applied to a three-phase, four-wire (phases a, b, and c, and neutral conductor n) electrical distribution system as a zero-sequence current filter. The zig-zag transformer has six windings: 12, 14, 16, 18, 20 and 22. Normally, each of these windings has an equal number of turns. The six windings are installed on a three-phase magnetic core which has three core legs (not shown). Windings 12 and 18 are installed on a first core leg, windings 16 and 22 are installed on a second core leg, and windings 20 and 14 are installed on a third core leg. The three-phase magnetic core may comprise an E-shaped core to provide the three legs, a separate core for each related pair of windings (essentially three separate single-phase transformers), or any other physical architecture in which each related pair of windings shares a common magnetic flux path.

Connected in this fashion, the zero sequence currents, which flow through each pair of windings on the common core leg, will be equal but of opposite polarity. The flux produced by each of these windings will also be equal and have opposite polarity. As a result of flux cancellation, the zero-sequence impedance of the zig-zag transformer 10 will be reduced to the resistance of the transformer's winding conductors (although there may be some leakage inductance that does not core couple).

The zero-sequence impedance of an ideal zig-zag transformer will normally be at least ten times lower than that of the power source. By connecting the zig-zag transformer 10 in parallel with the power source and the single-phase, non-linear loads (not shown), the load-generated zero-sequence currents will be attracted by the lower impedance of the zig-zag transformer 10. This will result in a reduction of the zero-sequence currents in the three-phase, four-wire system between the zig-zag transformer 10 connection and the power source.

The low zero-sequence impedance of the zig-zag transformer 10 will only balance currents as dictated by other grounding impedances throughout the distribution network. It cannot balance any zero-sequence current for which there is not a directly proportional zero-sequence voltage. The presently disclosed embodiments provide the addition of a Cascade Multilevel Modular Inverter (CMMI) that enables the zero-sequence impedance to be actively controlled, allowing injection of zero-sequence current that is less dependent on the network conditions. This additional controllability enables balancing of the local node zero-sequence, or injection control based on balancing a remote node such as an upstream feed.

Figure 2:
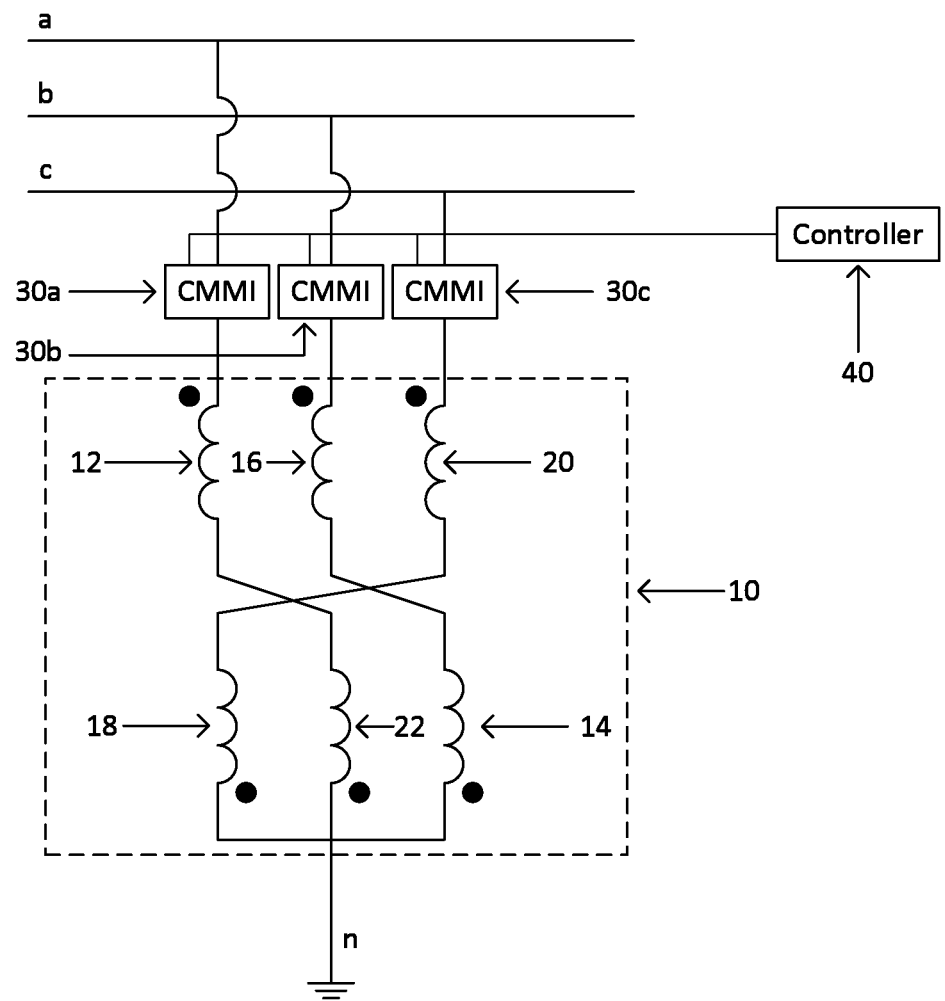
FIG. 2 is a schematic diagram illustrating a four-terminal zig-zag transformer combined with a Cascade Multilevel Modular Inverter (CMMI) topology, which is applied to a three-phase, four-wire electrical distribution system in accordance with an embodiment.

With reference now to FIG. 2, there is illustrated a schematic diagram of the zig-zag transformer 10 combined with a Cascade Multilevel Modular Inverter (CMMI) topology (sometimes also referred to as a Cascade Multilevel Inverter (CMI)) to further extend balancing capability to minimize zero-sequence current in the three-phase, four-wire electrical distribution system in one embodiment. A CMMI 30a is connected between phase a and the zig-zag transformer 10, a CMMI 30b is connected between phase b and the zig-zag transformer 10, and a CMMI 30c is connected between phase c and the zig-zag transformer 10. The present disclosure contemplates the use of any CMMI design, such as those described in U.S. Pat. No. 5,642,275 to Peng et al. and U.S. Pat. No. 9,294,003 to Peng, to name just a few non-limiting examples.

As is known in the art, each CMMI 30 comprises a plurality of H-bridges (or equivalent circuitry) under the control of a controller 40, such as via a fiber optic connection to name just one non-limiting embodiment. Each H-bridge can assume only three voltages: +Vdc, 0, and, −Vdc at any given time (Vdc being the internal DC link voltage of the H-bridge). The controller 40 modulates the states of the H-bridges to build an AC waveform out of a series string of H-bridges in the CMMI 30.

The voltage is chosen by the controller 40 in order to control an equivalent impedance that draws an appropriate neutral current through the zig-zag transformer 10 (which has low zero-sequence impedance and high positive/negative sequence impedance, thereby blocking the regular balanced fundamental voltage away from the CMMI 30 modules). This neutral current is generally chosen to cancel the neutral current sensed in the line. In other embodiments, the chosen neutral current may be based on a remotely sensed imbalance, rather than on a local value, determined by the power utility as a critical load point in the system. The desired injection current is then translated by the controller into a desired zero-sequence reactive impedance, based on measurement of the local terminal voltage, allowing the controller to regulate the current without generating or consuming real power. A real power term can be added to compensate for internal power loss, but this should be very small relative to the injected current for a well-designed system. The feedback controller then modulates the voltages imposed by the CMMI H-bridges, using any of several well-known pulse-width modulation techniques, for example, to create an approximation of the instantaneous voltage needed to control the injection current with a feedback-based algorithm such as, but not limited to, a proportional-integral controller.

The zig-zag transformer 10 blocks the fundamental three-phase voltage with a high impedance and presents a relatively low impedance to common-mode currents that flow in the neutral. As such the CMMI 30 branches need only act on the voltage components associated with imbalance, and the sum of the CMMI 30 branch voltages acts on the neutral current by imposing or cancelling neutral voltage in conjunction with the transformer impedance.

Figure 3:
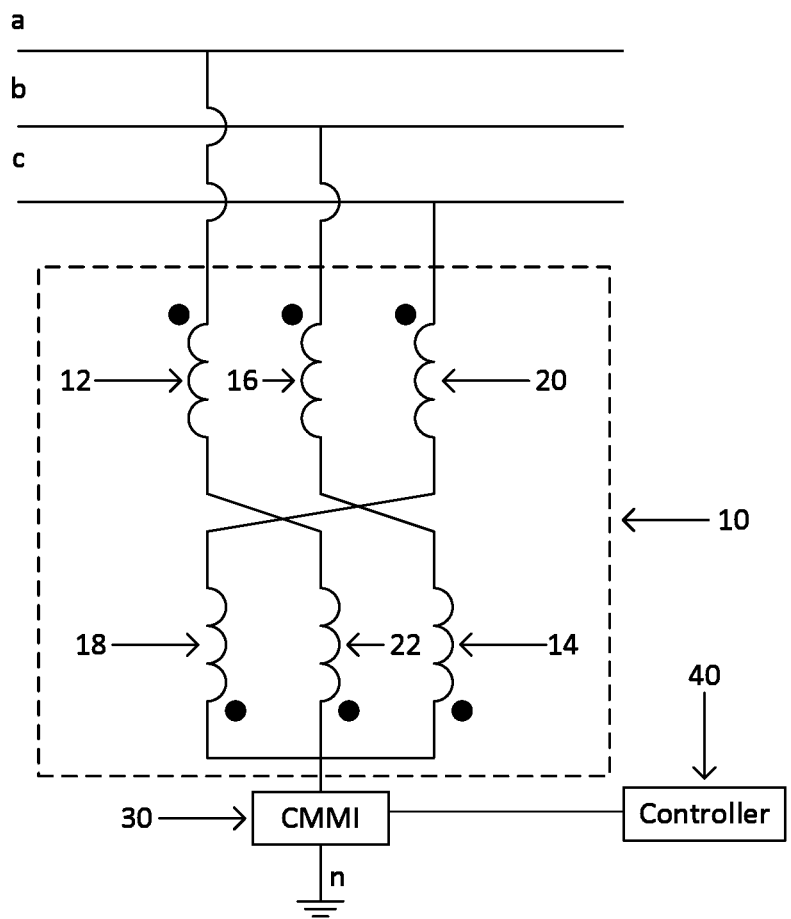
FIG. 3 is a schematic diagram illustrating a four-terminal zig-zag transformer combined with a CMMI topology to further extend balancing capability to minimize zero-sequence current in the three-phase, four-wire electrical distribution system in accordance with an embodiment.

With reference now to FIG. 3, there is illustrated a schematic diagram of the zig-zag transformer 10 combined with a CMMI topology to further extend balancing capability to minimize zero-sequence current in the three-phase, four-wire electrical distribution system in one embodiment. With respect to the topology of FIG. 2, to reduce the grid neutral current, the most critical control is the sum of the voltages (common-mode). This enables the simplification of the circuit to FIG. 3, which uses a CMMI 30 module only in the neutral line, and therefore has a cost reduction benefit.

Figure 4:
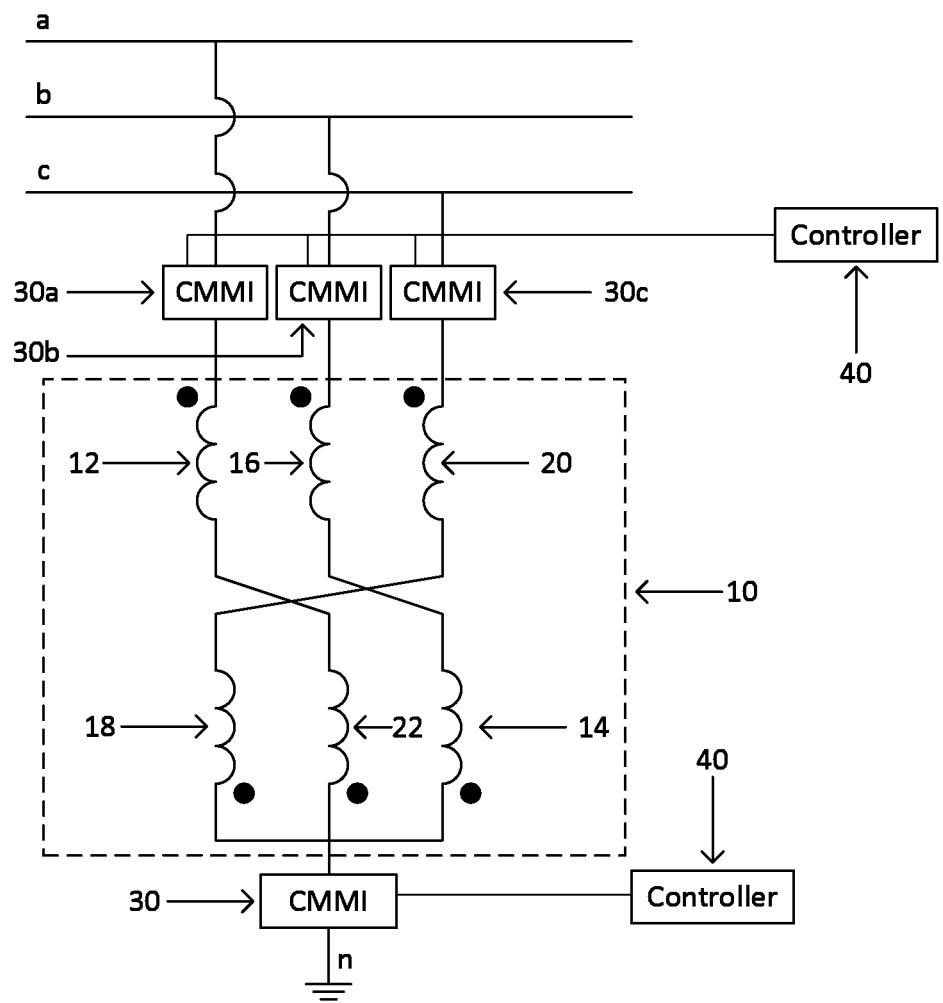
FIG. 4 is a schematic diagram illustrating a four-terminal zig-zag transformer combined with a CMMI topology to further extend balancing capability to minimize zero-sequence current in the three-phase, four-wire electrical distribution system in accordance with an embodiment.

FIG. 4 illustrates a schematic diagram of the zig-zag transformer 10 combined with a CMMI topology to further extend balancing capability to minimize zero-sequence current in the three-phase, four-wire electrical distribution system in one embodiment. With respect to the topology of FIG. 4, CMMI modules 30a, 30b and 30c are included in the phase branches and CMMI module 30d is included in the neutral branch (between the transformer wye-point connection and the neutral). Although this topology adds complexity and more CMMI modules 30, it may lead to improvement in grid current balance under some conditions. In some embodiments, an inductor (not shown) may be connected in series with the H-bridges of each of the delta-connected CMMI modules 30a, 30b and 30c.

Figure 5:
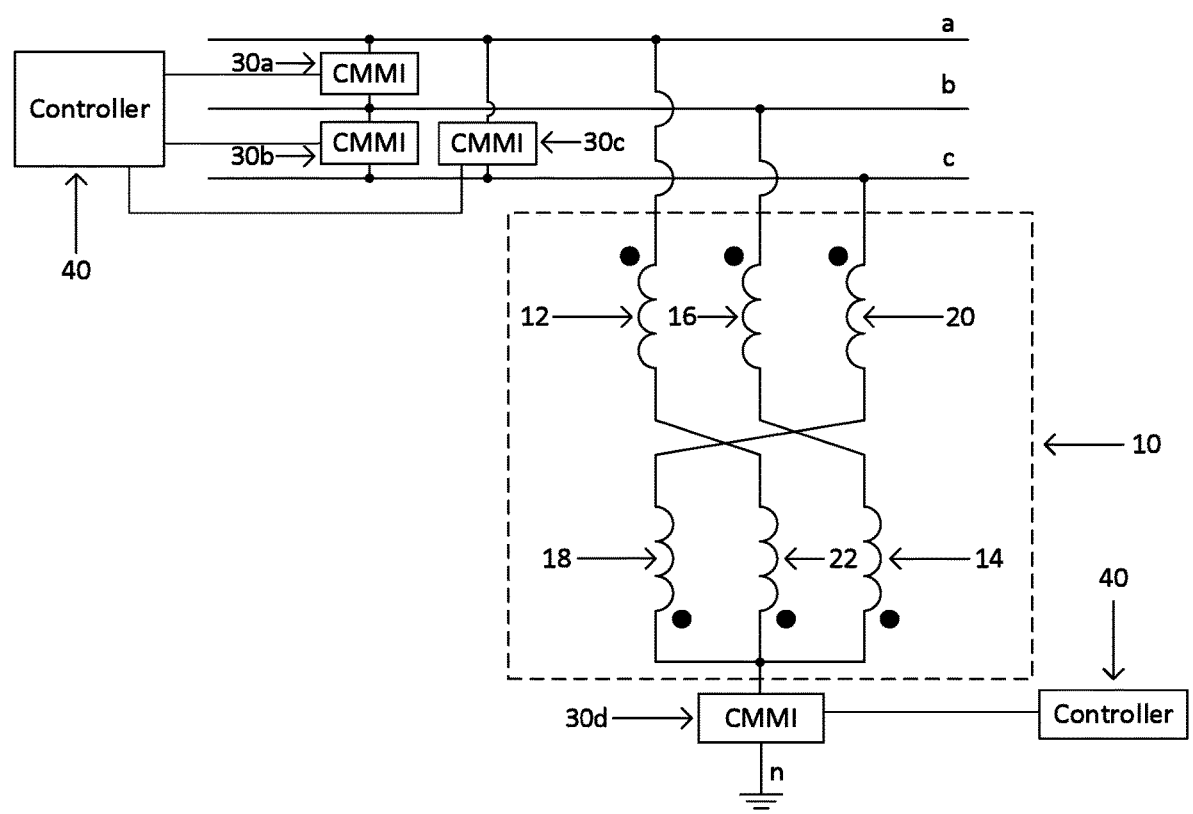
FIG. 5 is a schematic diagram illustrating a four-terminal zig-zag transformer combined with a CMMI topology to further extend balancing capability to minimize zero-sequence current and negative-sequence currents in the three-phase, four-wire electrical distribution system in accordance with an embodiment.

FIG. 5 illustrates a schematic diagram of the zig-zag transformer 10 combined with a CMMI topology to further extend balancing capability to minimize zero-sequence current and negative-sequence currents in the three-phase, four-wire electrical distribution system in one embodiment. With respect to the topology of FIG. 5, there is shown an implementation that, in addition to the CMMI module 30d in the neutral conductor, further adds delta-connected CMMI modules 30a, 30b and 30c between each of the three phases of the power system. This allows more robust balancing of differences between phase currents known as negative-sequence current that is caused by unbalanced line-to-line loads. The combination of the delta-connected CMMI branches 30 and the zig-zag transformer 10 as shown leads to the overall best balancing capability, though with a higher complexity. It will be appreciated that the delta-connected CMMI modules 30a, 30b and 30c can be added to any of the embodiments disclosed herein. In some embodiments, an inductor (not shown) may be connected in series with the H-bridges of each of the delta-connected CMMI modules 30a, 30b and 30c.

Figure 6:
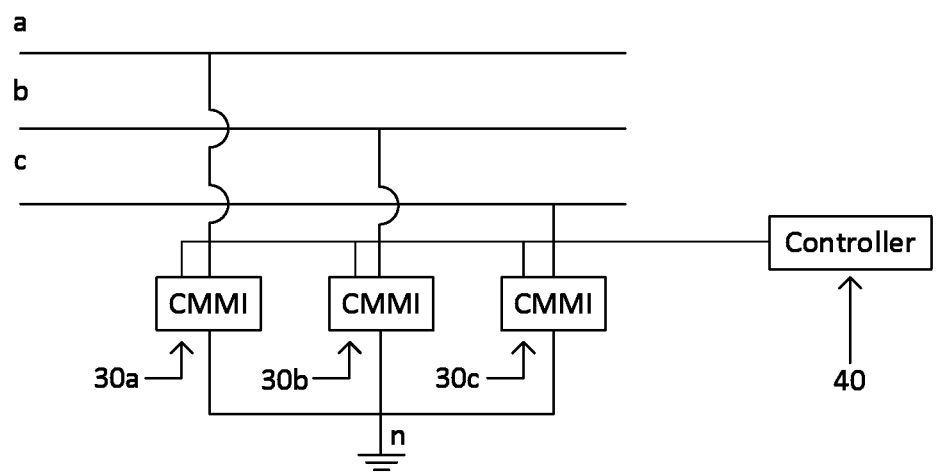
FIG. 6 is a schematic diagram of a CMMI topology without a zig-zag transformer to further extend balancing capability to minimize zero-sequence current in the three-phase, four-wire electrical distribution system in accordance with an embodiment.

FIG. 6 illustrates a schematic diagram of a CMMI topology without the zig-zag transformer 10 to further extend balancing capability to minimize zero-sequence current in the three-phase, four-wire electrical distribution system in one embodiment. With respect to the topology of FIG. 6, there is shown an implementation that does not use the zig-zag transformer 10. Instead, the CMMI module 30a is coupled between phase a and the neutral conductor, CMMI module 30b is coupled between phase b and the neutral conductor, and CMMI module 30c is coupled between phase c and the neutral conductor. Although the embodiment of FIG. 6 is in some ways simpler than the other embodiments disclosed herein, this embodiment requires full-voltage rated CMMI branches 30. It does however carry the capability of injecting neutral current while adding the capability of reactive power support at the fundamental grid frequency without the delta-connected CMMI modules of FIG. 5. This reactive power support is enabled through independent control of the CMMI branch impedances, which can now carry positive-sequence current that would otherwise be blocked by the zig-zag impedance.

While the detailed description elaborates workable embodiments of the present invention, the embodiments shall not be construed as a limitation on the patented scope and claims of the present invention and, furthermore, all equivalent adaptations and modifications based on the technological spirit of the present invention shall remain protected within the scope and claims of the invention herein.

What is claimed:

1. A method for actively controlling zero-sequence current in a three-phase power distribution network having a phase A, a phase B, a phase C, and a neutral, the method comprising the steps of:
   a) operatively coupling a first Cascade Multilevel Modular Inverter (CMMI) first terminal to phase A, and operatively coupling a first CMMI second terminal to a first primary winding dot terminal of a transformer;
   b) operatively coupling a second CMMI first terminal to phase B, and operatively coupling a second CMMI second terminal to a second primary winding dot terminal of the transformer;
   c) operatively coupling a third CMMI first terminal to phase C, and operatively coupling a third CMMI second terminal to a third primary winding dot terminal of the transformer;
   d) operatively coupling a third primary winding non-dot terminal of the transformer to a first secondary winding non-dot terminal of the transformer, wherein the first primary winding and the first secondary winding share a first common magnetic flux path;
   e) operatively coupling a first primary winding non-dot terminal of the transformer to a second secondary winding non-dot terminal of the transformer, wherein the second primary winding and the second secondary winding share a second common magnetic flux path;
   f) operatively coupling a second primary winding non-dot terminal of the transformer to a third secondary winding non-dot terminal of the transformer, wherein the third primary winding and the third secondary winding share a third common magnetic flux path;
   g) operatively coupling a first secondary winding dot terminal of the transformer, a second secondary winding dot terminal of the transformer, and a third secondary winding dot terminal of the transformer to the neutral;
   h) modulating a first voltage produced by the first CMMI to control a first equivalent impedance between phase A and the neutral;
   i) modulating a second voltage produced by the second CMMI to control a second equivalent impedance between phase B and the neutral; and
   j) modulating a third voltage produced by the third CMMI to control a third equivalent impedance between phase C and the neutral.

2. The method of claim 1, wherein the first common magnetic flux path comprises a first leg of an E-shaped transformer core, the second common magnetic flux path comprises a second leg of the E-shaped transformer core, and the third common magnetic flux path comprises a third leg of the E-shaped transformer core.

3. A method for actively controlling zero-sequence current in a three-phase power distribution network having a phase A, a phase B, a phase C, and a neutral, the method comprising the steps of:
   a) operatively coupling phase A to a first primary winding dot terminal of a transformer;
   b) operatively coupling phase B to a second primary winding dot terminal of the transformer;
   c) operatively coupling phase C to a third primary winding dot terminal of the transformer;
   d) operatively coupling a third primary winding non-dot terminal of the transformer to a first secondary winding non-dot terminal of the transformer, wherein the first primary winding and the first secondary winding share a first common magnetic flux path;
   e) operatively coupling a first primary winding non-dot terminal of the transformer to a second secondary winding non-dot terminal of the transformer, wherein the second primary winding and the second secondary winding share a second common magnetic flux path;
   f) operatively coupling a second primary winding non-dot terminal of the transformer to a third secondary winding non-dot terminal of the transformer, wherein the third primary winding and the third secondary winding share a third common magnetic flux path;
   g) operatively coupling a first secondary winding dot terminal of the transformer, a second secondary winding dot terminal of the transformer, and a third secondary winding dot terminal of the transformer to a transformer wye-point;
   h) operatively coupling a first Cascade Multilevel Modular Inverter (CMMI) first terminal to the transformer wye-point;
   i) operatively coupling a first CMMI second terminal to the neutral; and
   j) modulating a first voltage produced by the first CMMI to control an equivalent impedance between the transformer wye-point and the neutral.

4. The method of claim 3, wherein the first common magnetic flux path comprises a first leg of an E-shaped transformer core, the second common magnetic flux path comprises a second leg of the E-shaped transformer core, and the third common magnetic flux path comprises a third leg of the E-shaped transformer core.

5. The method of claim 3, further comprising the steps of:
   k) operatively coupling a second CMMI first terminal to phase A and operatively coupling a second CMMI second terminal to phase B;

l) operatively coupling a third CMMI first terminal to phase B and operatively coupling a third CMMI second terminal to phase C;

m) operatively coupling a fourth CMMI first terminal to phase A and operatively coupling a fourth CMMI second terminal to phase C;

n) modulating a second voltage produced by the second CMMI to control a second equivalent impedance between phase A and phase B;

o) modulating a third voltage produced by the third CMMI to control a third equivalent impedance between phase B and phase C; and p) modulating a fourth voltage produced by the fourth CMMI to control a fourth equivalent impedance between phase A and phase C.

6. A method for actively controlling zero-sequence current in a three-phase power distribution network having a phase A, a phase B, a phase C, and a neutral, the method comprising the steps of:

a) operatively coupling a first Cascade Multilevel Modular Inverter (CMMI) first terminal to phase A, and operatively coupling a first CMMI second terminal to a first primary winding dot terminal of a transformer;

b) operatively coupling a second CMMI first terminal to phase B, and operatively coupling a second CMMI second terminal to a second primary winding dot terminal of the transformer;

c) operatively coupling a third CMMI first terminal to phase C, and operatively coupling a third CMMI second terminal to a third primary winding dot terminal of the transformer;

d) operatively coupling a third primary winding non-dot terminal of the transformer to a first secondary winding non-dot terminal of the transformer, wherein the first primary winding and the first secondary winding share a first common magnetic flux path;

e) operatively coupling a first primary winding non-dot terminal of the transformer to a second secondary winding non-dot terminal of the transformer, wherein the second primary winding and the second secondary winding share a second common magnetic flux path;

f) operatively coupling a second primary winding non-dot terminal of the transformer to a third secondary winding non-dot terminal of the transformer, wherein the third primary winding and the third secondary winding share a third common magnetic flux path;

g) operatively coupling a first secondary winding dot terminal of the transformer, a second secondary winding dot terminal of the transformer, and a third secondary winding dot terminal of the transformer to a transformer wye-point;

h) operatively coupling a fourth CMMI first terminal to the transformer wye-point;

i) operatively coupling a fourth CMMI second terminal to the neutral;

j) modulating a first voltage produced by the first CMMI to control a first equivalent impedance between phase A and the neutral;

k) modulating a second voltage produced by the second CMMI to control a second equivalent impedance between phase B and the neutral;

l) modulating a third voltage produced by the third CMMI to control a third equivalent impedance between phase C and the neutral; and m) modulating a fourth voltage produced by the fourth CMMI to control a fourth equivalent impedance between the transformer wye-point and the neutral.

7. The method of claim 6, wherein the first common magnetic flux path comprises a first leg of an E-shaped transformer core, the second common magnetic flux path comprises a second leg of the E-shaped transformer core, and the third common magnetic flux path comprises a third leg of the E-shaped transformer core.

* * * * *